US012456417B2

(12) United States Patent
Lin

(10) Patent No.: US 12,456,417 B2
(45) Date of Patent: Oct. 28, 2025

(54) PANEL BRIGHTNESS COMPENSATION METHOD SOLVING PROBLEM OF MURA VISUAL DEFECTS

(71) Applicant: AUO Corporation, Hsin-Chu (TW)

(72) Inventor: Chih-Yang Lin, Hsin-Chu (TW)

(73) Assignee: AUO CORPORATION, Hsin-Chu (TW)

(*) Notice: Subject to any disclaimer, the term of this patent is extended or adjusted under 35 U.S.C. 154(b) by 0 days.

(21) Appl. No.: 18/751,393

(22) Filed: Jun. 24, 2024

(65) Prior Publication Data

US 2025/0285579 A1 Sep. 11, 2025

(30) Foreign Application Priority Data

Mar. 6, 2024 (TW) ................................ 113108219

(51) Int. Cl.
*G09G 3/32* (2016.01)

(52) U.S. Cl.
CPC ....... *G09G 3/32* (2013.01); *G09G 2300/0814* (2013.01); *G09G 2300/0838* (2013.01);
(Continued)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 3/36; G09G 3/3611; G09G 3/3614; G09G 3/3622;
(Continued)

(56) References Cited

U.S. PATENT DOCUMENTS

2005/0212825 A1* 9/2005 Lee .......................... H04N 5/20 348/E5.073
2006/0284898 A1* 12/2006 Shen ...................... G09G 3/006 345/690

(Continued)

FOREIGN PATENT DOCUMENTS

CN 111899692 A 11/2020
CN 113129802 A 7/2021

(Continued)

*Primary Examiner* — Ke Xiao
*Assistant Examiner* — Nelson Lam
(74) *Attorney, Agent, or Firm* — WPAT, PC

(57) ABSTRACT

Panel brightness compensation method includes: generating a first input voltage by a first pixel circuit in first area of panel according to a first compensation voltage of first compensation table of a first driver of panel to determine a first system voltage of first pixel circuit according to first input voltage; generating a second input voltage by a second pixel circuit in second area of panel according to a second compensation voltage of second compensation table of a second driver of panel to determine a second system voltage of second pixel circuit according to second input voltage, which first area is not overlapping with second area; generating a first brightness according to first system voltage and first input voltage by first pixel circuit; and generating a second brightness according to second system voltage and second input voltage by second pixel circuit, which first brightness is close to second brightness.

13 Claims, 8 Drawing Sheets

(52) U.S. Cl.
CPC ............... *G09G 2310/0275* (2013.01); *G09G 2320/0233* (2013.01); *G09G 2320/0276* (2013.01); *G09G 2360/16* (2013.01)

(58) Field of Classification Search
CPC .... G09G 3/3625; G09G 3/364; G09G 3/3644; G09G 3/3648; G09G 3/3659; G09G 3/3666; G09G 3/3674; G09G 3/3677; G09G 3/3681; G09G 3/3685; G09G 3/3688; G09G 3/3692; G09G 3/3696; G09G 2320/0276; G09G 2320/0285; G09G 2320/0626
USPC ........................................ 345/76–83, 87–104
See application file for complete search history.

(56) References Cited

U.S. PATENT DOCUMENTS

2008/0158240 A1* 7/2008 Huang ................ G09G 3/3648 345/589
2010/0120471 A1* 5/2010 Uchikawa ............ G09G 3/3406 345/207
2011/0063332 A1* 3/2011 Liao ....................... G09G 5/395 345/89
2011/0109661 A1* 5/2011 Lee .......................... G09G 3/20 345/690
2012/0062609 A1* 3/2012 Jeon ..................... G09G 3/3208 345/77
2013/0249955 A1* 9/2013 Kim ..................... G09G 3/3233 345/77
2014/0028859 A1 1/2014 Kim et al.
2015/0124002 A1* 5/2015 Horikawa ............ G09G 3/3607 345/88
2015/0187303 A1* 7/2015 Choi ........................ G09G 3/20 345/87
2016/0093243 A1* 3/2016 Su ............................ H04N 5/58 345/690
2020/0154003 A1* 5/2020 Chen .................... G09G 3/3648
2023/0122681 A1 4/2023 Park et al.

FOREIGN PATENT DOCUMENTS

CN 115995197 A 4/2023
TW 201405539 A 2/2014
TW 201434031 A 9/2014

* cited by examiner

PANEL BRIGHTNESS COMPENSATION METHOD SOLVING PROBLEM OF MURA VISUAL DEFECTS

CROSS-REFERENCE TO RELATED APPLICATION

This application claims priority to Taiwan Application Serial Number 113108219, filed Mar. 6, 2024, which is herein incorporated by reference in its entirety.

BACKGROUND

Field of Invention

The present disclosure relates to a compensation method and an electronic device. More particularly, the present disclosure relates to a panel brightness compensation method and a display device.

Description of Related Art

Conventional panels are gamma corrected to a standard gamma function (e.g. Gamma 2.2) before leaving a factory. However, since each panel in a panel is different, it is easy for a panel to produce display visual defects (or called mura).

At this time, conventional visual inspection and defect correction technology (or called Demura) is to obtain a brightness value of each pixel point of a panel by photographing a panel with a charge coupled device (CCD) when a panel displays grayscale images. Then, a value of gray scale or a voltage value of pixel points in the display visual defects (or called mura) and a corresponding gamma compensation table is generated to make overly dark areas brighter and overly bright areas darken to achieve a uniform display effect.

However, when each pixel of a panel is configured to emit light according to compensation voltages of the same gamma compensation table, a panel generates display visual defects (or called mura), which is defined as an irregular-shaped place with low contrast and local uneven brightness and chromaticity when a display device is displayed at a preset brightness.

For the foregoing reasons, there is a need for providing a panel brightness compensation method and a display device to solve the above problems encountered in related art approaches.

SUMMARY

One aspect of the present disclosure provides a panel brightness compensation method. The panel brightness compensation method includes following steps: generating a first input voltage by a first pixel circuit in a first area of a panel according to a first compensation voltage of a first compensation table of a first data driver of a panel to determine a first system voltage of the first pixel circuit according to the first input voltage; generating a second input voltage by a second pixel circuit in a second area of the panel according to a second compensation voltage of a second compensation table of a second data driver of the panel to determine a second system voltage of the second pixel circuit according to the second input voltage, which the first area is not overlapping with the second area; generating a first brightness according to the first system voltage and the first input voltage by the first pixel circuit; and generating a second brightness according to the second system voltage and the second input voltage by the second pixel circuit, which the first brightness is close to the second brightness.

Another aspect of the present disclosure provides a display device. The display device includes a panel, a first data driver, a second data driver, a first pixel circuit and a second pixel circuit. The first data driver is configured to store a first compensation table of a first area of the panel. The second data driver is configured to store a second compensation table of a second area of the panel. The first area is not overlapping with the second area. The first pixel circuit is coupled to the first data driver, and is configured to generate a first input voltage according to a first compensation voltage of the first compensation table. The first pixel circuit is configured to determine a first system voltage according to the first input voltage so as to generate a first brightness according to the first system voltage and the first input voltage. The second pixel circuit is coupled to the second data driver, and is configured to generate a second input voltage according to a second compensation voltage of the second compensation table. The second pixel circuit is configured to determine a second system voltage according to the second input voltage so as to generate a second brightness according to the second system voltage and the second input voltage. The first brightness is close to the second brightness.

The present disclosure provides a panel brightness compensation method and a display device. Through a panel brightness compensation method of the present disclosure, a brightness of different areas of a panel is compensated by different compensation tables to be closer to a standard gamma curve. The present disclosure also provides a design of a level shift circuit to produce a fine-tuning compensation effect to make a panel more uniform.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
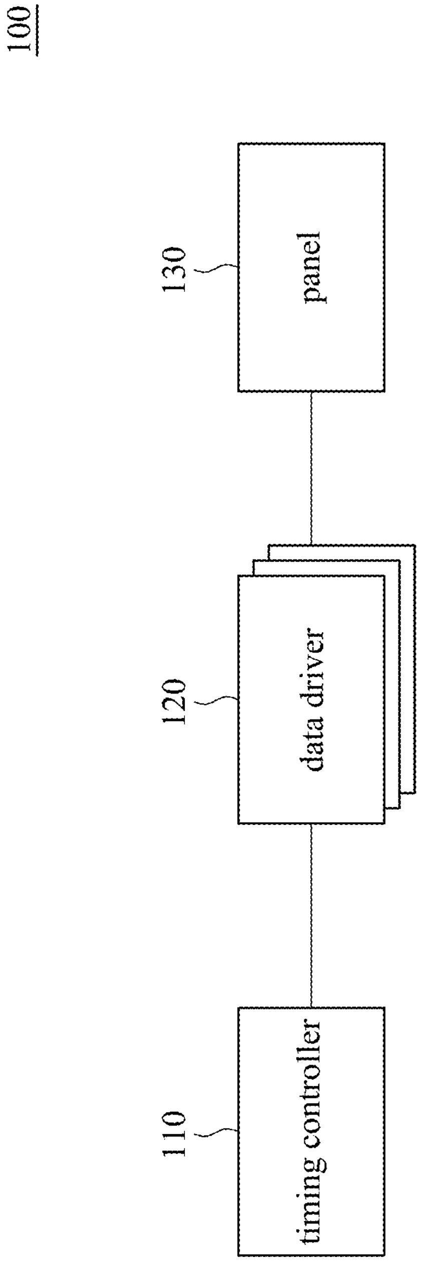
FIG. 1 depicts a schematic diagram of a display device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a display device 100 according to some embodiments of the present disclosure. In one embodiment, the display device 100 includes a timing controller 110, a plurality of data drivers 120 and a panel 130. The timing controller 110 is coupled to the data drivers 120. The data drivers 120 are coupled to the panel 130.

In some embodiments, the timing controller 110 is configured to receive pieces of image data, convert the pieces of image data into data formats corresponding to the data driver 120 (also known as source drivers), and generate control signals to gate drivers of the panel 130 (not shown in the figure). The timing controller 110 may be a processor with computing capabilities. Alternatively, the timing controller 110 may be designed using a hardware description language (HDL) or any other digital circuit design method familiar to those skilled in the art, and may be implemented using a field programmable gate. The timing controller 110 may be a hardware circuit implemented through a field programmable gate array (FPGA), a complex programmable logic device (CPLD) or an application-specific integrated circuit (ASIC).

In some embodiments, the data drivers 120 are configured to generate corresponding clock signals, enable signals, data signals and switching signals to the pixel circuits (not shown in the figure) in the panel 130 according to the data formats converted by the timing controller 110.

In some embodiments, the pixel circuits in the panel 130 emit light according to the clock signals, the enable signals, the data signals and the switching signals respectively to display a plurality of images.

Figure 2:
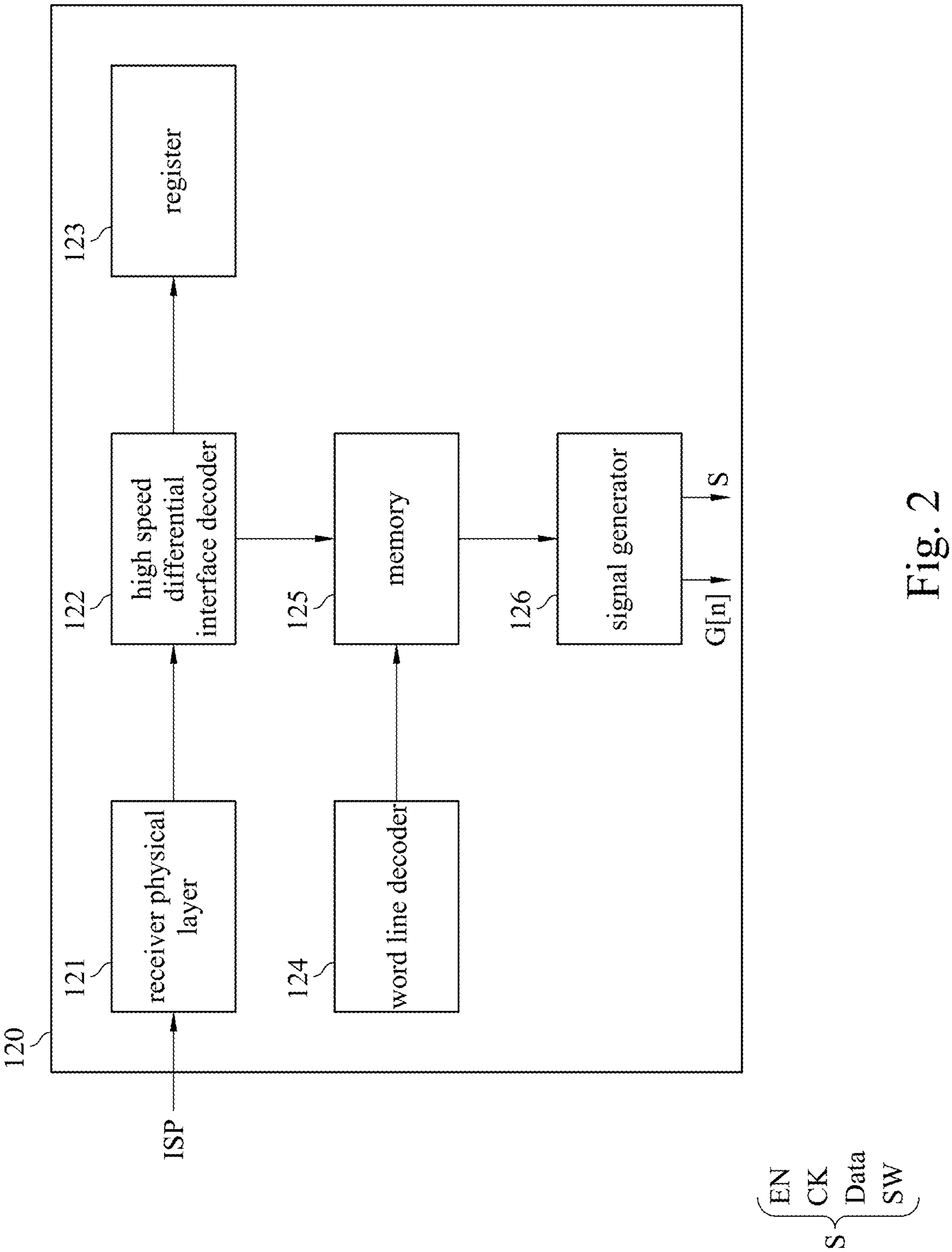
FIG. 2 depicts a schematic diagram of data drivers of a display device according to some embodiments of the present disclosure.

FIG. 2 depicts a schematic diagram of data drivers 120 of the display device 100 in FIG. 1 according to some embodiments of the present disclosure. Each of the data drivers 120 includes a receiver physical layer 121, a high speed differential interface decoder 122, a register 123, a word line decoder 124, a memory 125 and a signal generator 126. The receiver physical layer 121 is coupled to the high speed differential interface decoder 122. The high speed differential interface decoder 122 is coupled to the register 123 and the memory 125. The memory 125 is coupled to the word line decoder 124 and the signal generator 126.

In some embodiments, the receiver physical layer 121 is configured to provide a transmission path for the image processing signal ISP, and is configured to transmit pieces of related data of the image processing signal ISP.

In some embodiments, the high speed differential interface decoder 122 is configured to optimize signals (e.g.: the image processing signal ISP), and eliminate noise (e.g.: common mode noise and phase shift) in the signals (e.g.: the image processing signal ISP).

In some embodiments, the register 123 is configured to temporarily store data and addresses of instructions and signals (e.g.: the image processing signal ISP), and its speed of reading and writing instructions and data is very fast.

In some embodiments, the word line decoder 124 includes a multiple-input multiple-output logic gate and is configured to convert encoded input data into encoded output data. Encoding of the encoded input data and the encoded output data here are different.

In some embodiments, the memory 125 can be implemented as a static random-access memory (SRAM), and is configured to store a compensation table of a display field and generate a waveform of a driving signal according to the image processing signal ISP.

In some embodiments, the signal generator 126 is configured to generate a plurality of corresponding signals S (e.g. clock signals CK, the enable signals EN, data signals Data and switching signals SW) and compensated/uncompensated signal G [n] according to the compensation table of the display field and the waveform of the driving signal in the memory 125.

Figure 3:
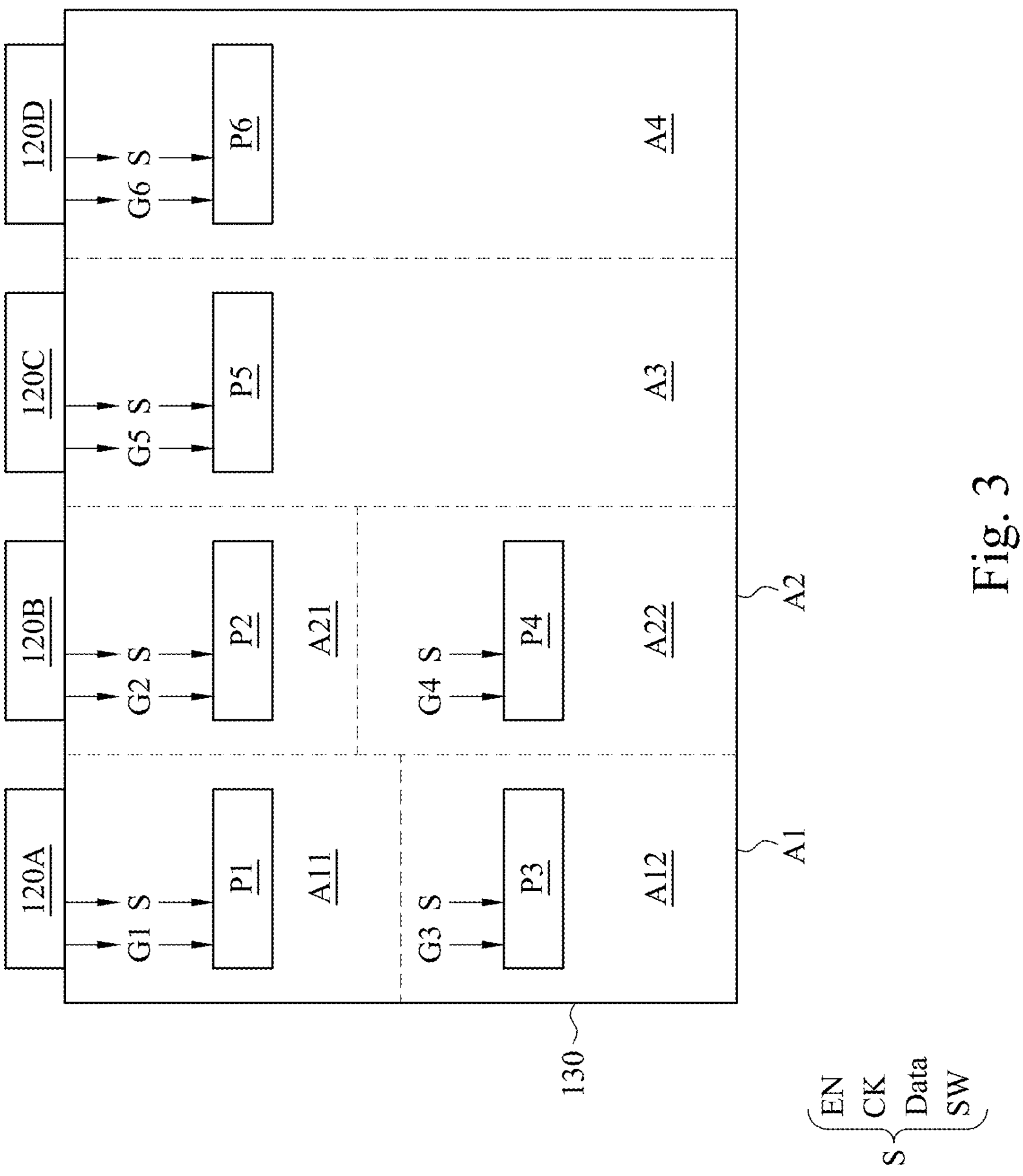
FIG. 3 depicts a schematic diagram of data drivers and a panel of a display device according to some embodiments of the present disclosure.

In order to facilitate the understanding an operation of the display device 100 of the present disclosure, please refer to FIG. 3 together. FIG. 3 depicts a schematic diagram of the data drivers 120 (i.e., corresponding to a data driver 120A to a data driver 120D in FIG. 3) and the panel 130 of the display device 100 in FIG. 1 according to some embodiments of the present disclosure. Conventional display panels are gamma corrected to a standard gamma curve (curves of different grayscales corresponding to brightness, such as Gamma 2.2) before leaving a factory. However, since each pixel in a panel is different, and when each pixel emits light according to the compensation voltage of the same gamma compensation table, it will cause visual inspection and defect correction (or called Demura) effects on the panel. In other words, please refer to FIG. 3, if a plurality of pixel circuits in the panel 130 (e.g.: a pixel circuit P1 to a pixel circuit P6) emit light according to a compensation voltage of the same gamma compensation table, an average gamma curve of a sub-area A11 of an area A1 may be close to Gamma 2.6. An average gamma curve of a sub-area A12 of the area A1 may be close to Gamma 2.4. An average gamma curve of a sub-area A21 of the area A2 may be close to Gamma 2.0. An average gamma curve of a sub-area A22 of the area A2 may be close to Gamma 1.8. An average gamma curve of an area A3 may be close to Gamma 2.2. An average gamma curve of an area A4 may be close to Gamma 2.0. Therefore, conventional gamma adjustment method will cause an overall brightness of the panel 130 to be uneven. The present disclosure will describe how to the aforementioned problems in following paragraphs.

Methods adopted in the present disclosure to solve the aforementioned problems is to use different compensation tables for gamma curves in different areas so that the gamma curves in different areas are converted by the compensation tables to be close to the standard gamma curve (e.g. Gamma 2.2). Following paragraphs will be used with FIG. 3 to introduce how to generate different compensation tables for the gamma curves in different areas.

First, the panel 130 of the display device 100 in FIG. 1 is configured to capture pieces of optical data of the panel 130 through a visual inspection and defect correction (or called Demura) test equipment (not shown in the figure) before products leave a factory, which includes pieces of chromaticity and brightness data. Then, the test equipment is configured to establish different gamma curves for each pixel circuit (e.g., the pixel circuit P1 to the pixel circuit P6) in each area (e.g., the area A1 to the area A4) according to the pieces of chromaticity and brightness of the panel 130. It should be noted that each pixel circuit includes a plurality of sub-pixel circuits. That is to say, the test equipment is configured to establish gamma curves for different colors of light based on sub-pixel circuits of different colors of light (e.g., red light, green light, and blue light).

Then, the test equipment is configured to calculate an average gamma curve of the area A1 (equivalent to an average brightness of the plurality of pixel circuits in the area A1 corresponding to different gray levels) according to gamma curves of pixel circuits of the area A1 (e.g. the pixel circuit P1 and the pixel circuit P3). At the same time, the test equipment is configured to calculate an average gamma curve of the area A2 (equivalent to an average brightness of the plurality of pixel circuits in the area A2 corresponding to different gray levels) according to gamma curves of pixel circuits of the area A2 (e.g. the pixel circuit P2 and the pixel circuit P4). It should be noted that relevant calculation operations of the area A3 and the area A4 are similar to the relevant calculation operations of the area A1 and the area A2, and detail repetitious descriptions are omitted here.

Furthermore, the test equipment is configured to compare a standard gamma curve of a built-in software (e.g. Gamma 2.2) with the average gamma curve of the area A1 to calculate compensation voltages corresponding to each of pixel circuits in the area A1 (e.g. the pixel circuit P1 and the pixel circuit P3) so as to generate a compensation table corresponding to each of pixel circuits to be stored in the data driver 120A. At the same time, the test equipment is configured to compare the gamma curve of a built-in software (e.g. Gamma 2.2) with the average gamma curve of the area A2 to calculate compensation voltages corresponding to each of pixel circuits in the area A2 (e.g. the pixel circuit P12 and the pixel circuit P4) so as to generate a compensation table corresponding to each of pixel circuits to be stored in the data driver 120B. A compensation table corresponding to one of the areas is listed below for reference.

TABLE 1

| gray level | Digital voltage of red light sub-pixel (unitless) | Digital voltage of green light sub-pixel | Digital voltage of blue light sub-pixel |
|---|---|---|---|
| 0 | 52 | 28 | 56 |
| 1 | 55 | 31 | 59 |
| 2 | 58 | 34 | 62 |
| 3 | 61 | 37 | 65 |
| 4 | 64 | 40 | 68 |
| 5 | 67 | 43 | 71 |
| 6 | 70 | 46 | 74 |
| 7 | 73 | 49 | 77 |
| 8 | 77 | 53 | 81 |
| 9 | 80 | 56 | 84 |
| 10 | 83 | 59 | 87 |
| 11 | 86 | 62 | 90 |
| 12 | 89 | 65 | 93 |

In table 1, values in the compensation table corresponding to the areas are only examples, and are not limited to the embodiment of the present disclosure.

It should be noted that the relevant calculations of the area A3 and the area A4 are similar to the aforementioned relevant calculations of the area A1 and the area A2, and detail repetitious descriptions are omitted here. It should be noted that a number of each of the data drivers and the areas can be design according to actual needs and is not limited to this embodiment.

Therefore, in the present disclosure, different compensation tables are used for the gamma curves in different areas so that the overall brightness of the panel 130 after products leave the factory is close to brightness changes of the standard gamma curve (e.g. Gamma 2.2), and brightness differences in different areas is reduced so that brightness of images displayed on the panel 130 is more uniform.

In addition to a design of different compensation tables in different areas of the present disclosure, the present disclosure also changes multiple pixel circuits in the panel 130 to fine-tune the brightness of images displayed on the panel 130. Details will be explained in following paragraphs.

Figure 4:
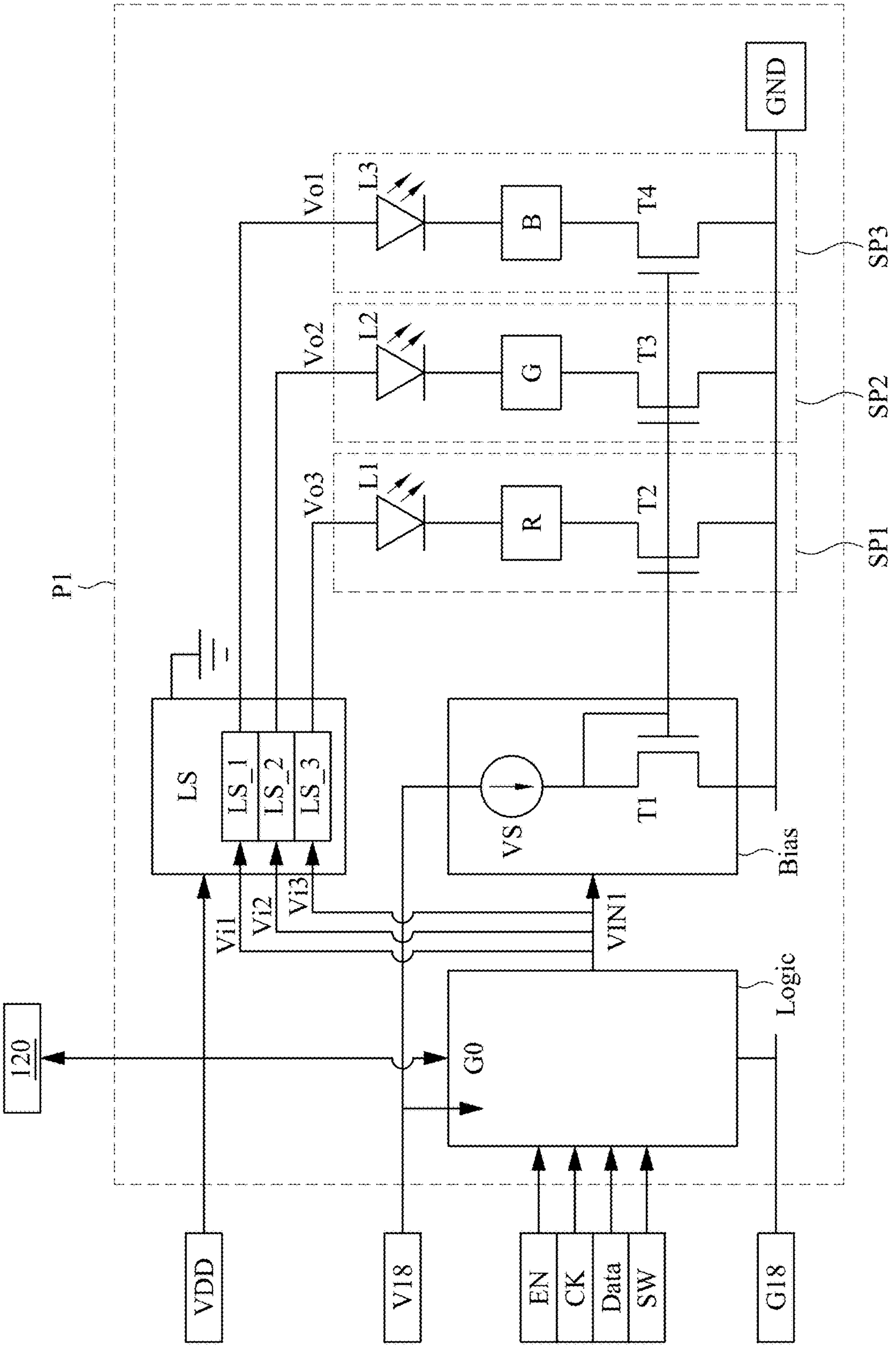
FIG. 4 depicts a schematic diagram of pixel circuits of a panel of a display device according to some embodiments of the present disclosure.

Please refer to FIG. 4, FIG. 4 depicts a schematic diagram of the pixel circuit P1 of the panel 130 in FIG. 3 according to some embodiments of the present disclosure. The pixel circuit P1 includes a logic circuit Logic, a bias circuit Bias, a level shift circuit LS and a plurality of sub-pixel circuits (e.g. a sub-pixel circuit SP1, a sub-pixel circuit SP2 and a sub-pixel circuit SP3). The logic circuit Logic is coupled to the data driver 120. The bias circuit Bias is coupled to the logic circuit Logic. The level shift circuit LS is coupled to the logic circuit Logic. The sub-pixel circuit SP1, the sub-pixel circuit SP2 and the sub-pixel circuit SP3 are respectively coupled to the bias circuit Bias.

In some embodiments, the logic circuit Logic is configured to an input voltage VIN1 according to an uncompensated voltage G0 of the data driver 120. It should be noted that the uncompensated voltage G0 does not use the aforementioned design of different compensation tables for different areas.

In some embodiments, the bias circuit Bias includes a voltage source VS and a transistor T1. The bias circuit Bias is configured to generate the driving signal according to the input voltage VIN1.

In some embodiments, the level shift circuit LS is configured to respectively determine system voltages (e.g.: an adjusted system voltage Vo1, an adjusted system voltage Vo2 and an adjusted system voltage Vo3) of a sub-pixel circuit SP1, a sub-pixel circuit SP2 and a sub-pixel circuit SP3 according to input bias voltages of the input voltage VIN1 (e.g. an input bias voltage Vi1, an input bias voltage Vi2 and an input bias voltage Vi3). The level shift circuit LS includes a secondary level shift circuit LS_1, a secondary level shift circuit LS_2 and a secondary level shift circuit LS_3. The secondary level shift circuit LS_1 is coupled to the sub-pixel circuit SP3. The secondary level shift circuit LS_2 is coupled to the sub-pixel circuit SP2. The secondary level shift circuit LS_3 is coupled to the sub-pixel circuit SP1.

In some embodiments, the sub-pixel circuit SP1 includes a light emitting element L1, a driving circuit R and a transistor T2. The sub-pixel circuit SP2 a light emitting element L2, a driving circuit G and a transistor T3. The sub-pixel circuit SP3 a light emitting element L3, a driving circuit B and a transistor T4. In some embodiments, the light emitting element L1 can be a micro-light-emitting diode with a red wavelength. The light emitting element L2 can be a micro-light-emitting diode with a green wavelength. The light emitting element L3 can be a micro-light-emitting diode with a blue wavelength. Settings of the light emitting element L1, the light emitting element L2 and the light emitting element L3 can be design according to actual needs and is not limited to this embodiment.

The sub-pixel circuit SP1, the sub-pixel circuit SP2 and the sub-pixel circuit SP3 are respectively configured to drive the light emitting element L1, the light emitting element L2 and the light emitting element L3 according to the system voltages (e.g.: the adjusted system voltage Vo1, the adjusted system voltage Vo2 and the adjusted system voltage Vo3) converted by the level shift circuit LS and the driving signal of the bias circuit Bias to generate a brightness of the pixel circuit P1 after mixing different colors of light. It should be noted that the level shift circuit LS of the present disclosure is configured to fine-tune the system voltages of a plurality of sub-pixel circuits (e.g. the sub-pixel circuit SP1, the sub-pixel circuit SP2 and the sub-pixel circuit SP3) according to the input voltage VIN1 to adjust a brightness of images displayed on the panel 130.

It is further explained that the circuit architecture of the pixel circuit P1 is only an example, and the present disclosure is not limited thereto. It will be understood by those of ordinary skill in the art that various modifications and applications may be made without departing from essential characteristics of the aspects. For example, the elements described in detail in the above aspects may be modified. In addition, differences related to these modifications and applications should be construed as being covered by the scope of the invention as defined by the following claims.

Figure 5:
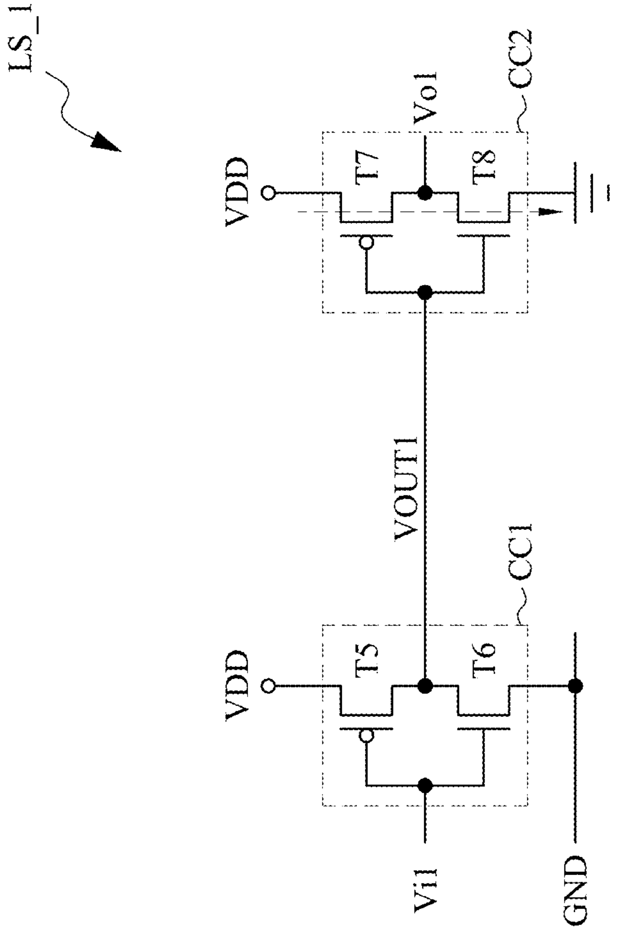
FIG. 5 depicts a schematic diagram of a level shift circuit of a pixel circuit of a panel of a display device according to some embodiments of the present disclosure.

In order to facilitate the understanding a structure of secondary level shift circuit LS_1 of the level shift circuit LS of the pixel circuit P1 of the present disclosure, please refer to FIG. 5 together. FIG. 5 depicts a schematic diagram of the secondary level shift circuit LS_1 of the level shift circuit LS of the pixel circuit P1 of the panel 130 of the display device 100 in FIG. 1 according to some embodiments of the present disclosure. The secondary level shift circuit LS_1 in FIG. 5 is corresponding to the secondary level shift circuit LS_1 of the level shift circuit LS in FIG. 4.

In some embodiments, a conversion circuit CC1 is configured to determine a duty circle of an output signal VOUT1 according to a voltage level of the input bias voltage Vi1 of the input voltage VIN1 and the system voltage VDD. A conversion circuit CC2 is configured to generate the system voltage Vo1, the system voltage Vo2 and the system voltage Vo3 of the plurality of sub-pixel circuits (e.g. the sub-pixel circuit SP1, the sub-pixel circuit SP2 and the sub-pixel circuit SP3) in FIG. 4 according to the duty circle of the output signal VOUT1 and the system voltage VDD.

In some embodiments, the secondary level shift circuit LS_1 includes the conversion circuit CC1 and the conversion circuit CC2. The conversion circuit CC1 includes a transistor T5 and a transistor T6. The conversion circuit CC2 includes a transistor T7 and a transistor T8. Please start from a top side and a right side of each of components in the picture as a first terminal, a first terminal of the transistor T5 is configured to receive the system voltage VDD. A second terminal of the transistor T5 is coupled to the first terminal of the transistor T6. A second terminal of the transistor T6 is connected to ground (i.e., connected to a ground terminal GND). A control terminal of the transistor T5 and a control terminal of the transistor T6 are configured to be conducted respectively in response to the voltage level of the input bias voltage Vi1. A first terminal of the transistor T7 is configured to receiver the system voltage VDD. A second terminal of the transistor T7 is coupled to the first terminal of the transistor T8. A second of the transistor T8 is connected to the ground. A control terminal of the transistor T7 and a control terminal of the transistor T8 are configured to be conducted respectively in response to the voltage level of the output voltage VOUT1. In some embodiments, the transistor T5 and the transistor T7 are P-type Metal-Oxide-Semiconductor Field-Effect Transistor (PMOS). In some embodiments, the transistor T6 and the transistor T8 are N-type Metal-Oxide-Semiconductor Field-Effect Transistor (NMOS).

In detail, the transistor T5 is conducted according to a duration of a low level of the input bias voltage Vi1 to determine a high level of the output signal VOUT1. The transistor T5 is turned off according to a high level of the input bias voltage Vi1. On the contrary, the transistor T6 is conducted according to a duration of a high level of the input bias voltage Vi1 to determine a low level of the output signal VOUT1. The transistor T6 is turned off according to a low level of the input bias voltage Vi1. The transistor T7 is conducted according to a duration of the low level of the output signal VOUT1 to determine a high level of the system voltage Vo1. The transistor T8 is conducted according to a duration of a high level of the output signal VOUT1 to determine a low level of the system voltage Vo1. Then, the sub-pixel circuit SP3 in FIG. 4 is configured to emit light according to the system voltage Vo1 of the secondary level shift circuit LS_1 and the driving signal of the bias circuit Bias.

It should be noted that the circuit architecture of the secondary level shift circuit LS_1 is only an example, and the present disclosure is not limited thereto. It will be understood by those of ordinary skill in the art that various modifications and applications may be made without departing from essential characteristics of the aspects. For example, the elements described in detail in the above aspects may be modified. In addition, differences related to these modifications and applications should be construed as being covered by the scope of the invention as defined by the following claims.

It should be further noted that a circuit structure of each of the secondary level shift circuit LS_2 and the secondary level shift circuit LS_3 is similar to the circuit structure of the secondary level shift circuit LS_1. Detail repetitious descriptions are omitted here. The present disclosure only uses the design of the above-mentioned level shift circuit LS to fine-tune a system voltage of each of pixel circuits to make a brightness of a panel of a display device uniform.

It should be added that a design of different compensation tables in different areas and a design of a level shift circuit LS to fine-tune a system voltage are two compensation functions. Users can activate the two compensation functions separately or simultaneously according to actual needs. In other words, the display device 100 of the present disclosure can be configured to select whether to input a compensation voltage of a compensation table to the level shift circuit LS according to user's instruction.

Figure 6:
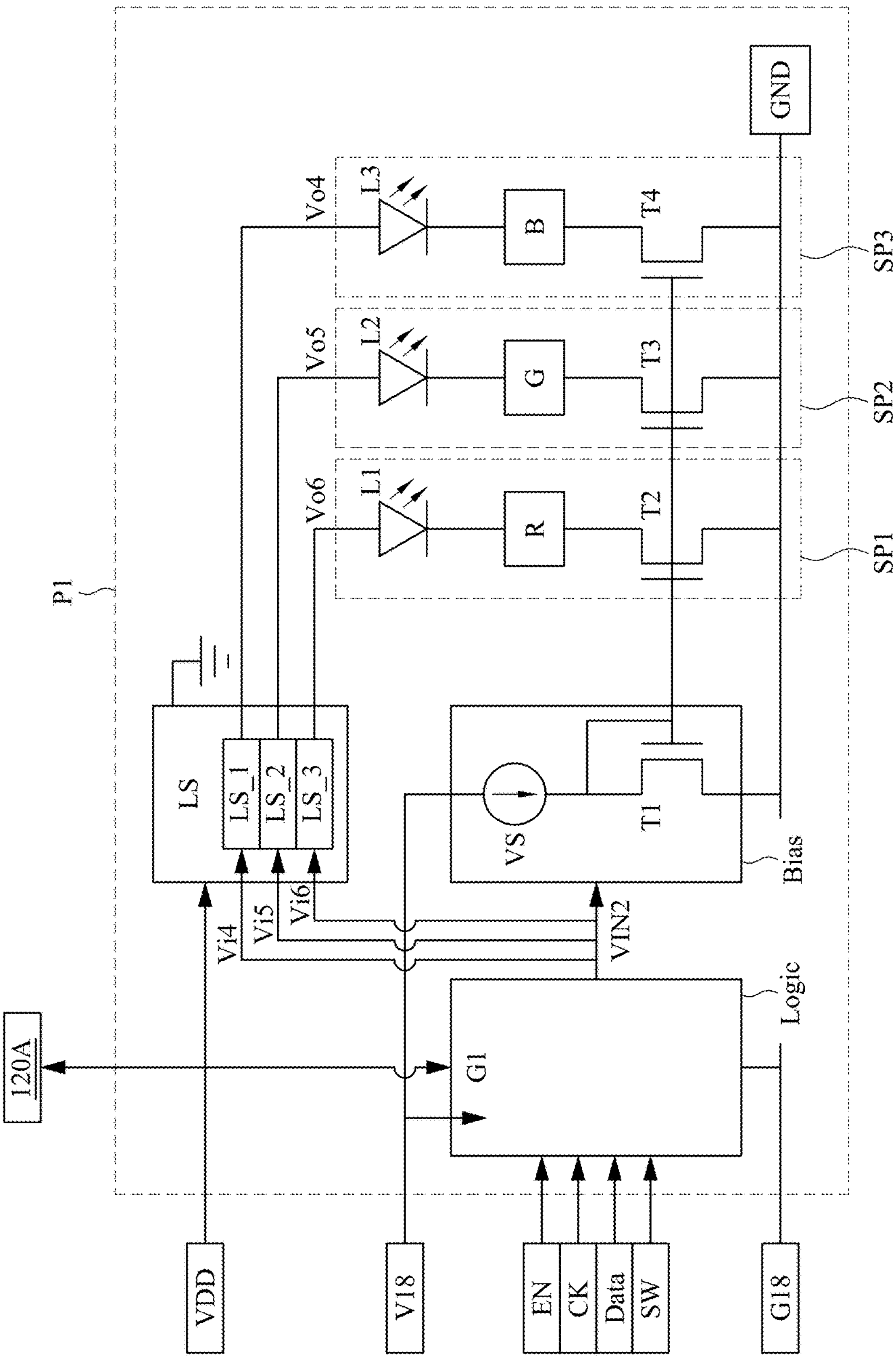
FIG. 6 depicts a schematic diagram of pixel circuits of a panel of a display device according to some embodiments of the present disclosure.

In some embodiments, the present disclosure can be further combined with the design of different compensation tables in different areas and the design of a level shift circuit LS to fine-tune the system voltage. In order to facilitate the understanding an operation of combing two designs of the display device 100 of the present disclosure, please refer to FIG. 6 together, FIG. 6 depicts a schematic diagram of the pixel circuits of the panel 130 of the display device 100 in FIG. 1 and FIG. 3 according to some embodiments of the present disclosure. Please refer to FIG. 3 and FIG. 6, the data driver 120A is coupled to the pixel circuit P1 and the pixel circuit P3 of the area A1. The data driver 120B is coupled to the pixel circuit P2 and the pixel circuit P4 of the area A2. The data driver 120C is coupled to the pixel circuit P5 of the area A3. The data driver 120D is coupled to the pixel circuit P6 of the area A4.

A circuit structure of each of the pixel circuit P2 to the pixel circuit P6 is similar to the circuit structure of the pixel circuit P1. The pixel circuit P1 and the data driver 120A in FIG. 6 correspond to the pixel circuit P1 and the data driver 120A in FIG. 3.

Then, please refer to FIG. 3, the data driver 120A is configured to transmit the plurality of signals S (e.g. clock signals CK, the enable signals EN, data signals Data and switching signals SW) and compensation voltage G1 of a compensation table corresponding to the pixel circuit P1 of the area A1. The data driver 120A is configured to transmit the plurality of signals S (e.g. clock signals CK, the enable signals EN, data signals Data and switching signals SW) and a compensation voltage G3 of a compensation table corresponding to the pixel circuit P3 of the area A1. The compensation voltage G1 is different from the compensation voltage G3.

The data driver 120B is configured to transmit the plurality of signals S (e.g. clock signals CK, the enable signals EN, data signals Data and switching signals SW) and a compensation voltage G2 of a compensation table corresponding to the pixel circuit P2 of the area A2. The data driver 120B is configured to transmit the plurality of signals S (e.g. clock signals CK, the enable signals EN, data signals Data and switching signals SW) and a compensation voltage G4 of a compensation table corresponding to the pixel circuit P4 of the area A2. The compensation voltage G2 is different from the compensation voltage G4.

Since detail circuit structure of the pixel circuit P1 in FIG. 6 is similar to the detail circuit structure of the pixel circuit P1 in FIG. 4, only differences will be described below. A difference between the embodiment in FIG. 4 and the embodiment in FIG. 6 is that the logic circuit Logic in FIG. 6 is configured to generate an input voltage VIN2 according to the compensation voltage G1 of the compensation table of the data driver 120A. The level shift circuit LS is configured to respectively determine the system voltages (e.g.: an adjusted system voltage Vo4, an adjusted system voltage Vo5 and an adjusted system voltage Vo6) of the sub-pixel circuit SP1, the sub-pixel circuit SP2 and the sub-pixel circuit SP3 according to input bias voltages (e.g.: an input bias voltage Vi4, an input bias voltage Vi5 and an input bias voltage Vi6) of the input voltage VIN2, thereby making a brightness of a panel more uniform. Detail operations and circuit structures have been explained in aforementioned paragraphs, and detail repetitious descriptions are omitted here.

Figure 7:
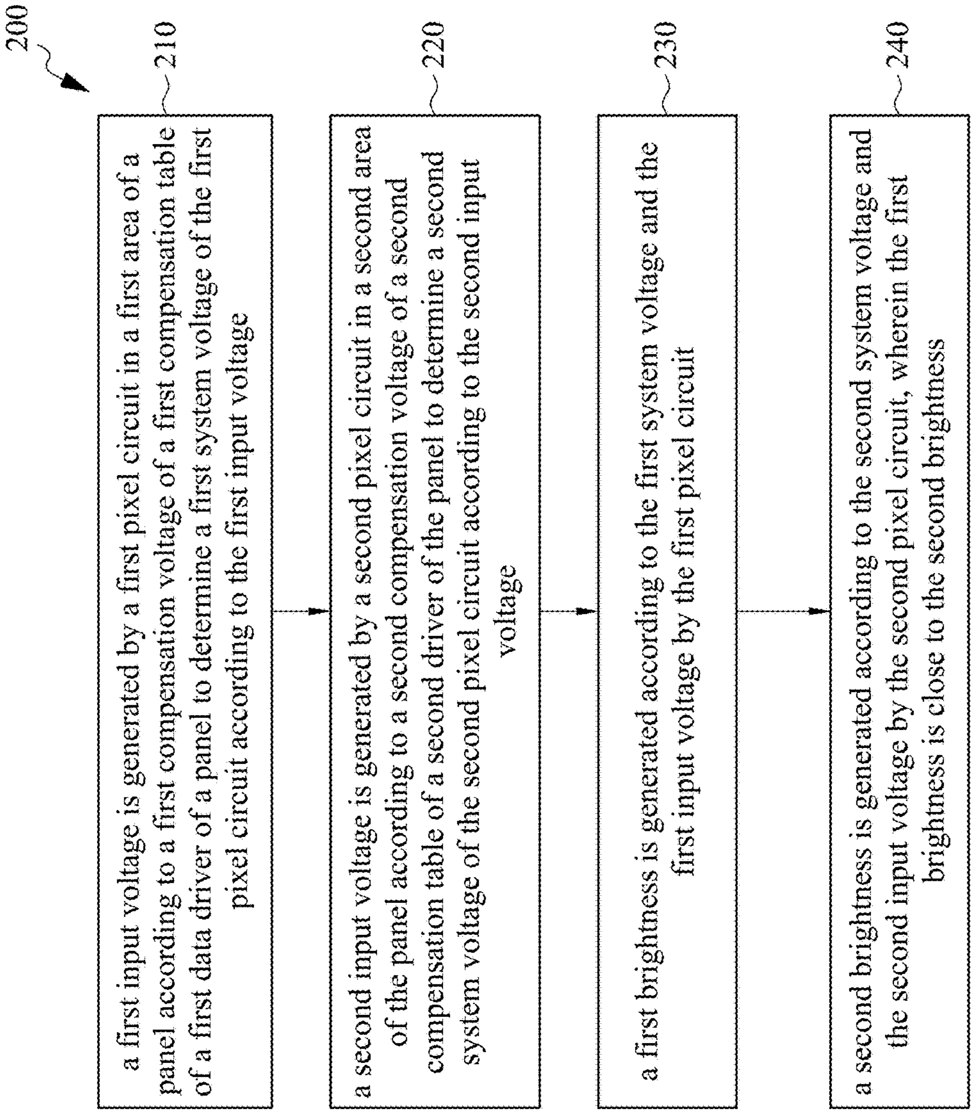
FIG. 7 depicts a flow chart of a panel brightness compensation method according to some embodiments of the present disclosure.

FIG. 7 depicts a flow chart of a panel brightness compensation method 200 according to some embodiments of the present disclosure. The panel brightness compensation method 200 is implemented by the display device 100 in FIG. 1. The panel brightness compensation method 200 includes a step 210 to a step 240.

In step 210, please refer to FIG. 3, FIG. 5 to FIG. 7, the pixel circuit P1 in the area A1 of the panel 130 is configured to generate the input voltage VIN2 according to the compensation voltage G1 of the compensation table of the data driver 120A of the panel 130 to determine the system voltage Vo1 of the pixel circuit P1 according to the input voltage VIN2. At the same time, pixel circuit P3 in the area A1 of the panel 130 is configured to generate an input voltage (not shown in the figure) according to the compensation voltage G3 of the compensation table of the data driver 120A of the panel 130 to determine the system voltage (not shown in the figure) of the pixel circuit P3 according to the input voltage (not shown in the figure). It should be noted that the compensation voltage G1 is different from the compensation voltage G3. Therefore, the input voltage VIN2 inputted into the pixel circuit P1 and the input voltage inputted into the pixel circuit P3 are also different.

In step 220, please refer to FIG. 3, FIG. 5 to FIG. 7, the pixel circuit P2 in the area A2 of the panel 130 is configured to generate an input voltage according to the compensation voltage G2 of the compensation table of the data driver 120B of the panel 130 to determine the system voltage of the pixel circuit P2 according to the input voltage. At the same time, the pixel circuit P4 in the area A2 of the panel 130 is configured to generate an input voltage according to the compensation voltage G4 of the compensation table of the data driver 120B of the panel 130 to determine the system voltage of the pixel circuit P4 according to the input voltage. It should be noted that the compensation voltage G2 is different from the compensation voltage G4. Therefore, the input voltage inputted into the pixel circuit P2 and the input voltage inputted into the pixel circuit P4 are also different.

In step 230, the brightness of the pixel circuit P1 is generated by the pixel circuit P1 according to the system voltage Vo4 to the system voltage Vo6 converted by the level shift circuit LS and the input voltage VIN2. At the same time, an operation mode of the pixel circuit P3 is similar to an operation mode of the pixel circuit P1. For the sake of brevity, and detail repetitious descriptions are omitted here. Through the two designs of the present disclosure, a brightness presented by the pixel circuit P1 is close to a brightness presented by the pixel circuit P3.

In step 240, a brightness of the pixel circuit P2 is generated by the pixel circuit P2 according to the system voltage of the secondary level shift circuit of the inner level shift circuit and the input voltage. At the same time, an operation mode of the pixel circuit pixel circuit P4 is similar to an operation mode of the pixel circuit P2. For the sake of brevity, and detail repetitious descriptions are omitted here. Through the two designs of the present disclosure, a brightness presented by the pixel circuit pixel circuit P2 is close to a brightness presented by the pixel circuit pixel circuit P4. In addition, an average brightness of each of the area A1 to the area A4 is very close to the brightness of the standard gamma curve (e.g. Gamma 2.2).

Figure 8:
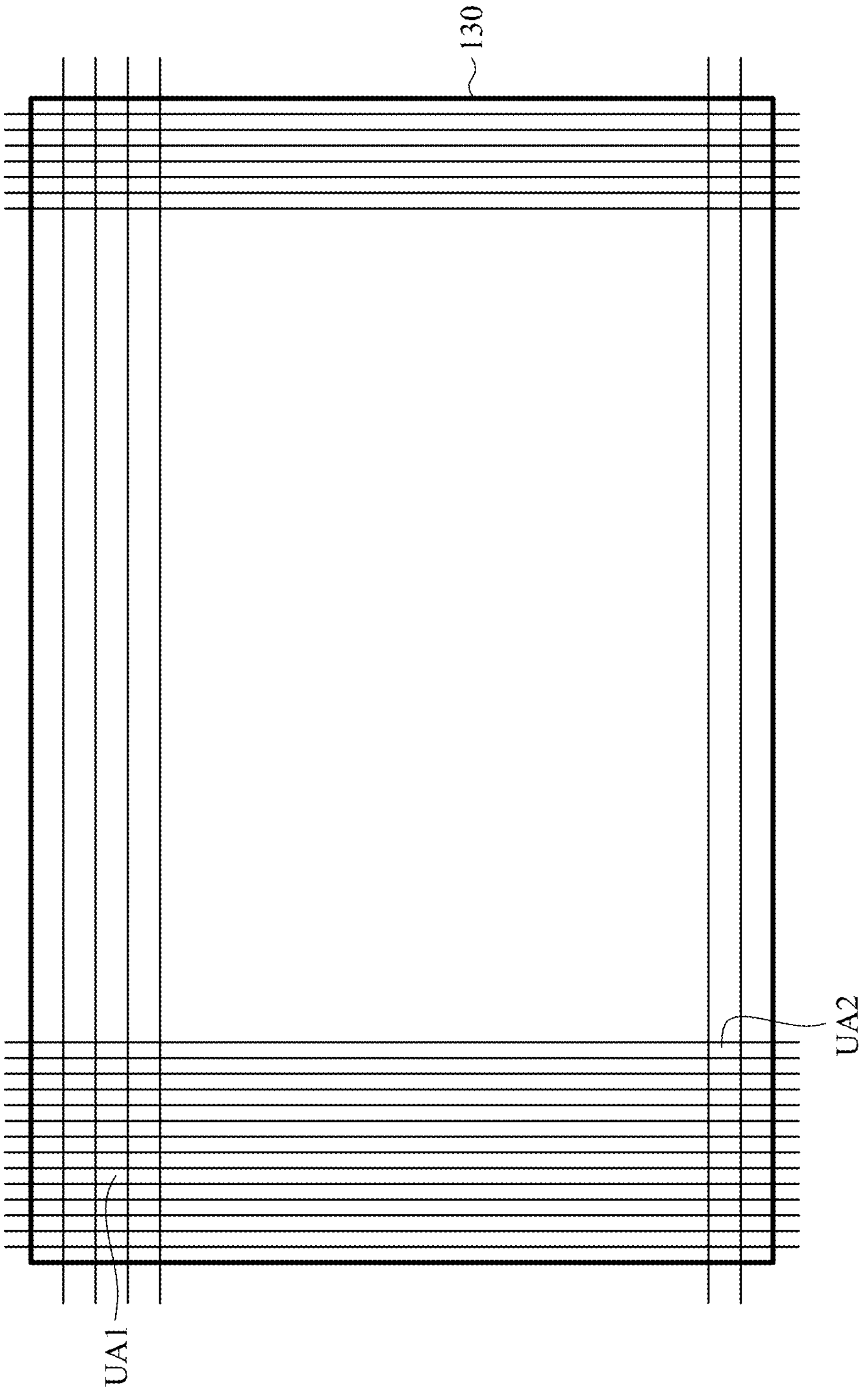
FIG. 8 depicts a schematic diagram of a regional uniformity of brightness adjusted by a panel brightness compensation method and level shift circuits of a display device according to some embodiments of the present disclosure.

FIG. 8 depicts a schematic diagram of a regional uniformity of adjusted by the panel brightness compensation method 200 and the aforementioned level shift circuit LS of the display device 100 according to some embodiments of the present disclosure. Please refer to FIG. 8, the present disclosure will divide a vertical axis (i.e. an upper side to an lower side of the figure) and a horizontal axis (i.e. an upper side to an lower side of the figure) into 150 blocks according to the panel 130. In some embodiments, the present disclosure uses a test equipment (not shown in the figure) to find out that the brightest area of the panel 130 is an area UA1 and the darkest area of the panel 130 is an area UA2, so as to a brightness uniformity (U %) of the panel 130. For example, if the brightness of the area UA1 is 100 and the brightness of the area UA2 is 80, the brightness uniformity of the panel 130 is 80%. The higher a value of the brightness uniformity is, the better a brightness uniformity of the panel 130 is.

In some embodiments, a uniformity of different color lights of the panel 130 can also be calculated through the test equipment. For example, a red light brightness uniformity of a panel that does not adopt the two designs of the present disclosure is 74.83%. A green light brightness uniformity of the panel is 75.49%. A blue light brightness uniformity of the panel is 78.52%. If the two designs of the present disclosure are adopted, a red light brightness uniformity of the panel 130 can be as high as 84.58%. The green light brightness uniformity is 83.77%. The blue light brightness uniformity is 82.63%.

Based on the aforementioned embodiments, the present disclosure provides a panel brightness compensation method and a display device. The present disclosure uses different compensation tables for the gamma curves in different areas so that an overall brightness of a panel of a display device after products leave a factory is close to a brightness of a standard gamma curve (e.g. Gamma2.2). Then, a display device of the present disclosure also provide a level shift design to fine-tune a system voltage of each of pixel circuit to make a brightness of a display device panel uniform. In addition, the present disclosure further combines a design of different compensation tables in different areas and a level shift design to fine-tune a system voltage of each of pixel circuits according to compensation voltages of different compensation table so as to make a brightness of a panel of a display device more uniform.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A panel brightness compensation method, comprising:

generating a first input voltage by a first pixel circuit in a first area of a panel according to a first compensation voltage of a first compensation table of a first data driver of the panel to determine a first system voltage of the first pixel circuit according to the first input voltage;

generating a second input voltage by a second pixel circuit in a second area of the panel according to a second compensation voltage of a second compensation table of a second data driver of the panel to determine a second system voltage of the second pixel circuit according to the second input voltage, wherein the first area is not overlapping with the second area;

generating a first brightness according to the first system voltage and the first input voltage by the first pixel circuit;

generating a second brightness according to the second system voltage and the second input voltage by the second pixel circuit, wherein the first brightness is close to the second brightness;

capturing a chromaticity and a brightness of the panel by a test equipment;

establishing a plurality of first gamma curves corresponding to a plurality of pixel circuits in the first area and a plurality of second gamma curves corresponding to a plurality of pixel circuits in the second area respective according to the chromaticity and the brightness of the panel by the test equipment;

calculating a first average gamma curve of the first area according to the first gamma curves by the test equipment;

calculating a second average gamma curve of the second area according to the second gamma curves by the test equipment;

generate the first compensation voltage corresponding to each of the pixel circuits of the first according to the first average gamma curve by the test equipment to establish the first compensation table so as to store the first compensation table to the first data driver; and generate the second compensation voltage corresponding to each of the pixel circuits of the second area according to the second average gamma curve by the test equipment to establish the second compensation table so as to store the second compensation table to the second data driver.

2. The panel brightness compensation method of claim 1, further comprising:

generating a third input voltage by a third pixel circuit in the first area of the panel according to a third compensation voltage of the first compensation table of the first data driver of the panel to determine a third system voltage of the third pixel circuit according to the third input voltage; and generating a third brightness according to the third system voltage and the third input voltage by the third pixel circuit, wherein the third brightness is close to the first brightness.

3. The panel brightness compensation method of claim 2, wherein the first input voltage is different from the third input voltage.

4. The panel brightness compensation method of claim 2, further comprising:

generating a fourth input voltage by a fourth pixel circuit in the second area of the panel according to a fourth compensation voltage of the second compensation table of the second data driver of the panel to determine a fourth system voltage of the fourth pixel circuit according to the fourth input voltage; and generating a fourth brightness according to the fourth system voltage and the fourth input voltage by the fourth pixel circuit, wherein the fourth brightness is close to the second brightness.

5. The panel brightness compensation method of claim 4, wherein the second input voltage is different from the fourth input voltage.

6. The panel brightness compensation method of claim 4, wherein the first data driver is coupled to the first pixel circuit and the third pixel circuit of the first area, wherein the second data driver is coupled to the second pixel circuit and the fourth pixel circuit of the second area.

7. A display device, comprising:

a panel;

a first data driver, configured to store a first compensation table of a first area of the panel;

a second data driver, configured to store a second compensation table of a second area of the panel, wherein the first area is not overlapping with the second area;

a first pixel circuit, coupled to the first data driver, and configured to generate a first input voltage according to a first compensation voltage of the first compensation table, wherein the first pixel circuit is configured to determine a first system voltage according to the first input voltage so as to generate a first brightness according to the first system voltage and the first input voltage; and a second pixel circuit, coupled to the second data driver, and configured to generate a second input voltage according to a second compensation voltage of the second compensation table, wherein the second pixel circuit is configured to determine a second system voltage according to the second input voltage so as to generate a second brightness according to the second system voltage and the second input voltage, wherein the first brightness is close to the second brightness, wherein the first compensation table and the second compensation table are established through a following method;

capturing a chromaticity and a brightness of the panel by a test equipment;

establishing a plurality of first gamma curves corresponding to a plurality of pixel circuits in the first area and a plurality of second gamma curves corresponding to a plurality of pixel circuits in the second area respectively according to the chromaticity and the brightness of the panel by the test equipment;

calculating a first average gamma curve of the first area according to the first gamma curves by the test equipment;

calculating a second average gamma curve of the second area according to the second gamma curves by the test equipment;

generate the first compensation voltage corresponding to each of the pixel circuits of the first area according to the first average gamma curve by the test equipment to establish the first compensation table so as to store the first compensation table to the first data driver; and generate the second compensation voltage corresponding to each of the pixel circuits of the second area according to the second average gamma curve by the test equipment to establish the second compensation table so as to store the second compensation table to the second data driver.

8. The display device of claim 7, wherein the first pixel circuit comprises:

a logic circuit, coupled to the first data driver, and configured to generate the first input voltage according to the first compensation voltage;

a bias circuit, coupled to the logic circuit, and configured to generate a driving signal according to the first input voltage;

a level shift circuit, coupled to the logic circuit, and configured to determine the first system voltage according to the first input voltage; and a plurality of sub-pixel circuits, coupled to the bias circuit and the level shift circuit, wherein the sub-pixel circuits is configured to drive a plurality of light emitting diodes of the sub-pixel circuits respectively according to the first system voltage and the driving signal to generate the first brightness.

9. The display device of claim 8, wherein the level shift circuit comprises:

a first conversion circuit, configured to determine a duty circle of an output signal according to a first level of the first input voltage and a system voltage; and a second conversion circuit, coupled to the first conversion circuit, and configured to generate the first system voltage according to the duty circle of the output signal and the system voltage.

10. The display device of claim 7, further comprising:

a third pixel circuit, located in the first area, and coupled to the first data driver, wherein the third pixel circuit is configured to generate a third input voltage according to a third compensation voltage of the first compensation table, wherein the third pixel circuit is configured to determine a third system voltage of the third pixel circuit according to the third input voltage so as to generate a third brightness according to the third system voltage and the third input voltage.

11. The display device of claim 10, further comprising:

a fourth pixel circuit, located in the second area, and coupled to the second data driver, wherein the fourth pixel circuit is configured to generate a fourth input voltage according to a fourth compensation voltage of the second compensation table, wherein the fourth pixel circuit is configured to determine a fourth system voltage of the fourth pixel circuit according to the fourth input voltage so as to generate a fourth brightness according to the fourth system voltage and the fourth input voltage.

12. The display device of claim 11, wherein the third brightness is close to the first brightness, wherein the fourth brightness is close to the second brightness.

13. The display device of claim 12, wherein the first input voltage is different from the third input voltage, wherein the second input voltage is different from the fourth input voltage.

* * * * *